(12) United States Patent
Kato et al.

(10) Patent No.: US 6,887,167 B2
(45) Date of Patent: May 3, 2005

(54) MULTI-PIECE SOLID GOLF BALL

(75) Inventors: Akira Kato, Kobe (JP); Keiji Moriyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/228,966

(22) Filed: Aug. 28, 2002

(65) Prior Publication Data

US 2003/0100387 A1 May 29, 2003

(30) Foreign Application Priority Data

Sep. 5, 2001 (JP) .......................................... 2001-268827
Oct. 11, 2001 (JP) .......................................... 2001-314034

(51) Int. Cl.⁷ .......................... A63B 37/04; A63B 37/06; A63B 37/12; A63B 37/14
(52) U.S. Cl. ........................................ 473/371; 473/378
(58) Field of Search ................................. 473/351–378

(56) References Cited

U.S. PATENT DOCUMENTS

| | | | | |
|---|---|---|---|---|
| 4,062,825 A | * | 12/1977 | Watabe et al. ............... 524/847 |
| 5,002,281 A | * | 3/1991 | Nakahara et al. ........... 473/373 |
| 5,553,852 A | | 9/1996 | Higuchi et al. |
| 5,711,723 A | * | 1/1998 | Hiraoka et al. ............. 473/374 |
| 5,782,707 A | | 7/1998 | Yamagishi et al. |
| 5,820,487 A | * | 10/1998 | Nakamura et al. .......... 473/374 |
| 5,948,862 A | * | 9/1999 | Sano et al. ...................... 525/89 |
| 6,123,628 A | * | 9/2000 | Ichikawa et al. ........... 473/371 |
| 6,248,029 B1 | | 6/2001 | Maruko |
| 6,390,936 B1 | * | 5/2002 | Sugimoto ................... 473/374 |
| 6,533,683 B2 | * | 3/2003 | Watanabe .................... 473/374 |
| 6,551,202 B1 | * | 4/2003 | Yoshida ...................... 473/376 |

FOREIGN PATENT DOCUMENTS

| | | |
|---|---|---|
| JP | 9-239068 | 9/1997 |
| JP | 2910516 | 4/1999 |
| JP | 11-151320 | 6/1999 |

* cited by examiner

Primary Examiner—Gregory Vidovich
Assistant Examiner—Alvin A. Hunter, Jr.
(74) Attorney, Agent, or Firm—Birch, Stewart, Kolasch & Birch, LLP

(57) ABSTRACT

The present invention provides a multi-piece solid golf ball, which is superior in flight distance, spin performance, shot feel and scuff resistance. The present invention relates to a multi-piece solid golf ball comprising a core consisting of a center and an intermediate layer, and a cover, wherein the center has a diameter of 25 to 40 mm, and a surface hardness (B) is higher than a central point hardness (A) of the center by not less than 15, the intermediate layer has a thickness of 0.5 to 8.0 mm, and a surface hardness of the intermediate layer (C) is higher than the (A) by 15 to 35, the cover comprises polyurethane-based thermoplastic elastomer as a main component, and has a thickness of 0.3 to 1.5 mm and a hardness (D) in Shore D hardness of 35 to 55, and the (D) is higher than the (D) by 3 to 25.

2 Claims, 3 Drawing Sheets

US 6,887,167 B2

MULTI-PIECE SOLID GOLF BALL

FIELD OF THE INVENTION

The present invention relates to a multi-piece solid golf ball. More particularly, it relates to a multi-piece solid golf ball, which is superior in flight distance, spin performance, shot feel and scuff resistance.

BACKGROUND OF THE INVENTION

As golf balls having high spin performance at approach shot and long flight distance, two-layer structured core type or two-layer structured cover type golf balls, which comprise a center formed from soft rubber, an intermediate layer formed on the center and from rubber or resin that is relatively harder than the center and a cover formed from soft material, have been proposed (Japanese Patent No. 2910516, Japanese Patent Publication Nos. 239068/1997, 151226/1998, 151320/1999 and the like).

In Japanese Patent No. 2910516, a multi-piece golf ball, of which the center has a diameter of not less than 29 mm, the intermediate layer has a JIS-C hardness of not less than 85, and the specific gravity of the center is larger than that of the intermediate layer, is described. However, since ionomer resin is used for the intermediate layer as a main component, the rebound characteristics of the resulting golf ball are poor, and the flight distance when hit by a driver is not sufficiently obtained.

In Japanese Patent Kokai Publication No. 239068/1997, a three-piece solid golf ball which comprises a core, an intermediate layer and a cover is described. The core has a JIS-C center hardness of not more than 75 and a JIS-C surface hardness of not more than 85, the surface hardness of the core is higher than the center hardness of the core by 8 to 20, the hardness of the intermediate layer is higher than the surface hardness of the core by not less than 5, and the hardness of the cover is lower than that of the intermediate layer by not less than 5, and the dimples occupy at least 62% of the ball surface. However, since the hardness difference between the center hardness and the surface hardness of the center is small and ionomer resin is used for the intermediate layer, the shot feel is hard and poor. In addition, the spin amount at the time of hitting is large, and the flight distance when hit by a driver is not sufficiently obtained.

In Japanese Patent Publication No. 151226/1998, a multi-piece golf ball, of which the center has a distortion of at least 2.5 mm under a load of 100 kg, the Shore D hardness of the intermediate layer is at least 13 degrees higher than that of the cover, and the ball as a whole has an inertia moment of at least 83 g-cm², is described. However, since ionomer resin is used for the intermediate layer, the shot feel is hard and poor. In addition, the rebound characteristics are poor, and the flight distance when hit by a driver is not sufficiently obtained.

In Japanese Patent Publication No. 151320/1999, a multi-piece golf ball, of which the center and intermediate layer are formed from rubber composition comprising polybutadiene rubber as a main component, the center has a diameter of 15 to 22 mm and a Shore D hardness of 40 to 70, is described. However, the diameter of the center is too small, and the rebound characteristics of the resulting golf ball are poor. In addition, the spin amount at the time of hitting is large, and the flight distance when hit by a driver is not sufficiently obtained.

There has been no golf ball, which is superior in flight distance, shot feel and scuff resistance.

OBJECTS OF THE INVENTION

A main object of the present invention is to provide a multi-piece solid golf ball, which is superior in flight distance, spin performance, shot feel and scuff resistance.

According to the present invention, the object described above has been accomplished by providing a multi-piece solid golf ball comprising a center, intermediate layer and cover, and by adjusting the diameter of the center, the hardness difference between the surface hardness and central point hardness of the center, the thickness of the intermediate layer, the hardness difference between the surface hardness of the intermediate layer and the central point hardness of the center, the thickness and hardness of the intermediate layer and the hardness difference between the surface hardness of the intermediate layer and the hardness of the cover to specified ranges, thereby providing a multi-piece solid golf ball, which is superior in flight distance, spin performance, shot feel and scuff resistance.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

The present invention provides a multi-piece solid golf ball comprising a core consisting of a center and an intermediate layer formed on the center, and a cover covering the core, wherein the center has a diameter of 25 to 40 mm, and a surface hardness in Shore D hardness of the center is higher than a central point hardness in Shore D hardness of the center by not less than 15, the intermediate layer has a thickness of 0.5 to 8.0 mm, and a surface hardness in Shore D hardness of the intermediate layer is higher than the central point hardness of the center by 15 to 35, the cover comprises polyurethane-based thermoplastic elastomer as a main component, and has a thickness of 0.3 to 1.5 mm and a hardness in Shore D hardness of 35 to 55, and the surface hardness of the intermediate layer is higher than the hardness of the cover by 3 to 25.

In the present invention, it can be accomplished to restrain the spin amount at the time of hitting and increase the flight distance by increasing the hardness difference between the surface hardness of the intermediate layer and the central point hardness of the center, and it can be accomplished to improve the shot feel and scuff resistance by adjusting the hardness difference between the intermediate layer and cover to a proper range.

In order to put the present invention into a more suitable practical application, it is preferable that the center and intermediate layer comprise cis-1,4-polybutadiene rubber as a main component; and the polyurethane-based thermoplastic elastomer be formed by using cycloaliphatic diisocyanate.

DETAILED DESCRIPTION OF THE INVENTION

Figure 1:
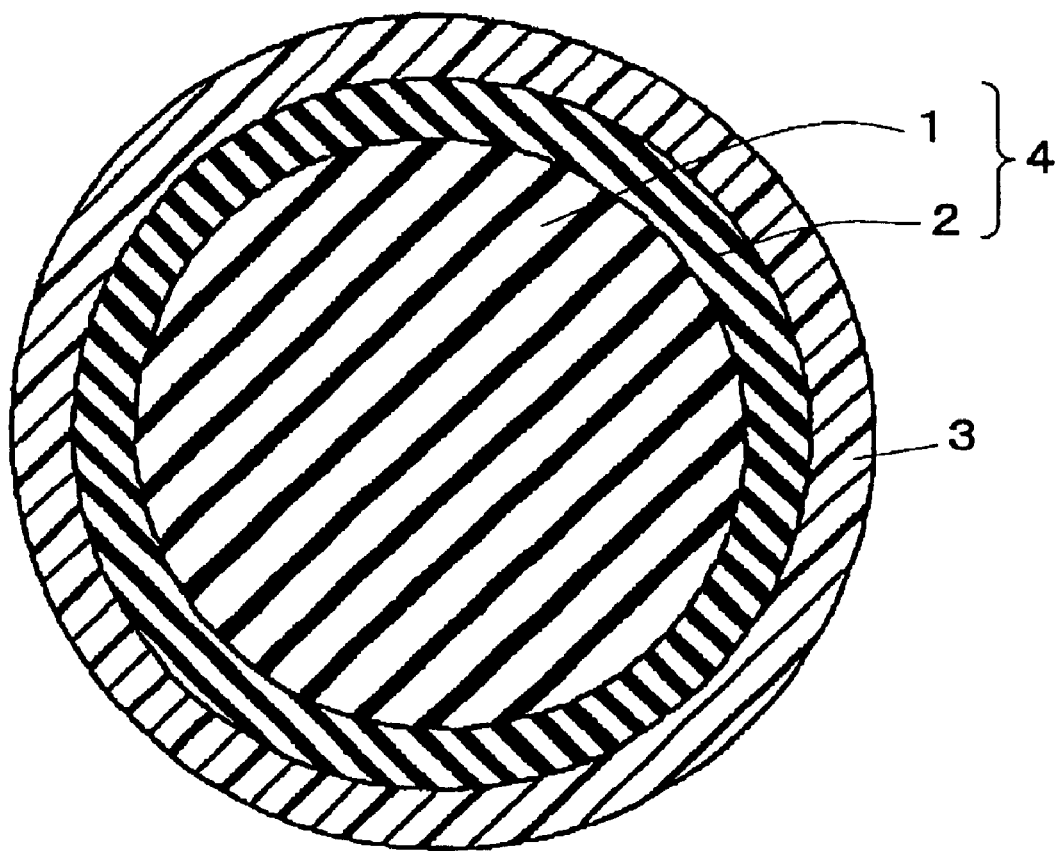
FIG. 1 is a schematic cross section illustrating one embodiment of the golf ball of the present invention.

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 4 consisting of a center 1 and an intermediate layer 2 formed on the center 1, and a cover 3 covering the core 4. The cover may have single-layer structure or multi-layer structure, which has two or more layers. In FIG. 1, in order to explain the golf ball of the present invention simply, a golf ball having one layer of cover 3, that is, a three-piece solid golf ball will be used hereinafter for explanation.

In the core 4, it is desired for both the center 1 and the intermediate layer 2 to comprise polybutadiene rubber as a main component. The core is preferably obtained by press-molding a rubber composition under applied heat. The rubber composition essentially contains polybutadiene, a co-crosslinking agent, an organic peroxide and a filler.

The polybutadiene used for the core 4 of the present invention may be one, which has been conventionally used for cores of solid golf balls. Preferred is high-cis polybutadiene rubber containing a cis-1,4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.), or a functional monomers (such as trimethylolpropane trimethacrylate, and the like), or a combination thereof. The preferred co-crosslinking agent is a zinc salt of α,β-unsaturated carboxylic acid, particularly zinc acrylate, because it imparts high rebound characteristics to the resulting golf ball. The amount of the co-crosslinking agent is from 10 to 60 parts by weight, preferably from 15 to 50 parts by weight, more preferably from 20 to 45 parts by weight, based on 100 parts by weight of the polybutadiene. When the amount of the co-crosslinking agent is larger than 60 parts by weight, the core is too hard, and the shot feel of the resulting golf ball is poor. On the other hand, when the amount of the co-crosslinking agent is smaller than 10 parts by weight, it is required to increase an amount of the organic peroxide in order to impart a desired hardness to the core, and the rebound characteristics are degraded, which reduces the flight distance.

The organic peroxide includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.5 to 5 parts by weight, preferably 0.5 to 4 parts by weight, more preferably 0.5 to 3 parts by weight, based on 100 parts by weight of the polybutadiene.

When the amount of the organic peroxide is smaller than 0.5 parts by weight, the core is too soft, and the rebound characteristics of the resulting golf ball are degraded, which reduces the flight distance. On the other hand, when the amount of the organic peroxide is larger than 5 parts by weight, it is required to decrease an amount of the co-crosslinking agent in order to impart a desired hardness to the core, and the rebound characteristics are degraded, which reduces the flight distance.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 3 to 40 parts by weight, preferably from 5 to 30 parts by weight, based on 100 parts by weight of the polybutadiene. When the amount of the filler is smaller than 3 parts by weight, it is difficult to adjust the weight of the resulting golf ball. On the other hand, when the amount of the filler is larger than 40 parts by weight, the weight ratio of the rubber component in the core is small, and the rebound characteristics reduce too much.

The rubber compositions for the center and intermediate layer of the golf ball of the present invention can contain other components, which have been conventionally used for preparing the core of solid golf balls, such as organic sulfide compound or antioxidant. If used, the amount is preferably 0.5 to 5 parts by weight, preferably 0.7 to 4 parts by weight, based on 100 parts by weight of the polybutadiene.

Figure 2:
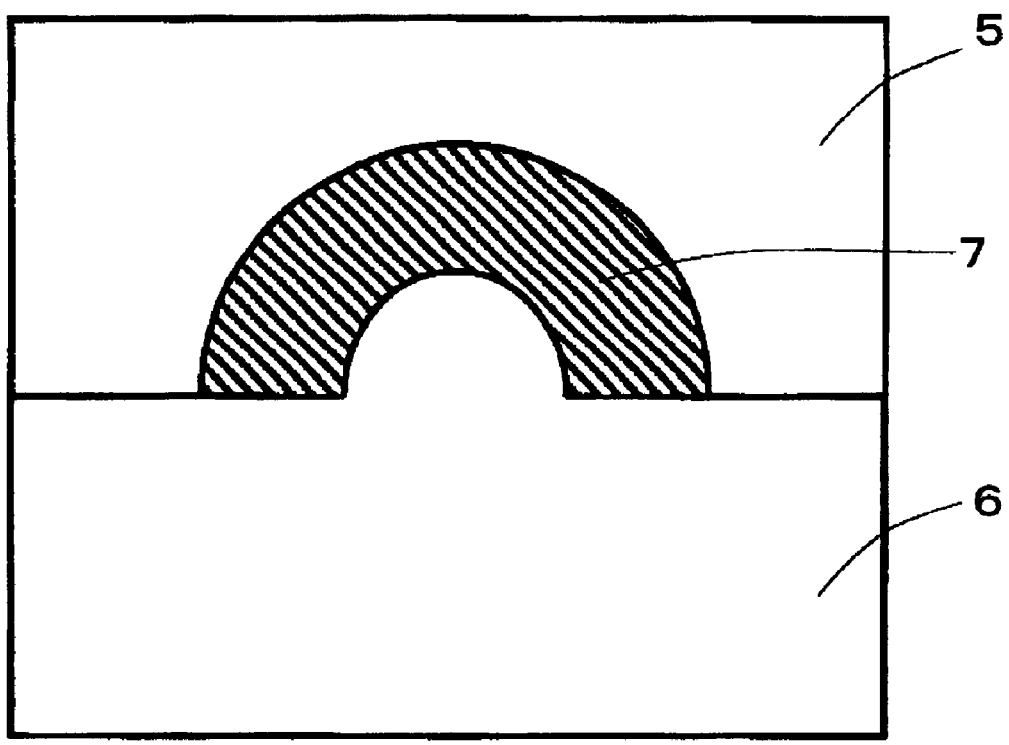
FIG. 2 is a schematic cross section illustrating one embodiment of a mold for molding an intermediate layer of the golf ball of the present invention.
Figure 3:
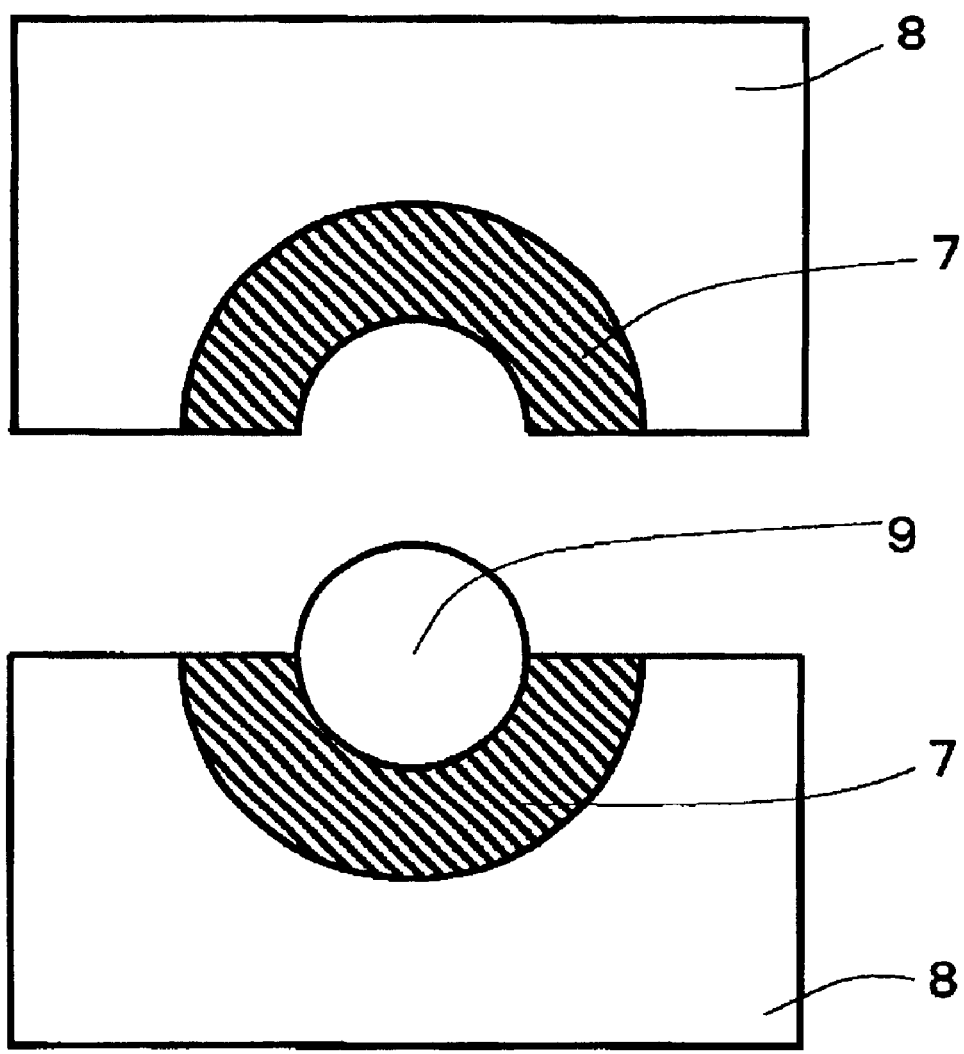
FIG. 3 is a schematic cross section illustrating one embodiment of a mold for molding a core of the golf ball of the present invention.

The process of producing the two-layer structured core 4 of the golf ball of the present invention will be explained with reference to FIG. 2 and FIG. 3. FIG. 2 is a schematic cross section illustrating one embodiment of a mold for molding an intermediate layer of the golf ball of the present invention. FIG. 3 is a schematic cross section illustrating one embodiment of a mold for molding a core of the golf ball of the present invention. The rubber composition for the center is press molded, for example, at 140 to 180° C. for 10 to 60 minutes in a mold to form a vulcanized spherical center. The rubber composition for the intermediate layer is then molded by press-molding using a mold having a semi-spherical cavity 5 and a male plug mold 6 having a semi-spherical convex having the same shape as the center as described in FIG. 2 to obtain an unvulcanized semi-spherical half-shell 7 for the intermediate layer. The vulcanized center 9 is covered with the two unvulcanized semi-spherical half-shells 7 for the intermediate layer, and then vulcanized by integrally press-molding, for example, at 140 to 180° C. for 10 to 60 minutes in a mold 8 for molding a core, which is composed of an upper mold and a lower mold, as described in FIG. 3 to obtain the core 4. The core 4 is composed of the center 1 and the intermediate layer 2 formed on the center.

In the golf ball of the present invention, it is required for the center 1 to have a diameter of 25 to 40 mm, preferably 27 to 38 mm, more preferably 30 to 38 mm. When the diameter of the center is smaller than 25 mm, the spin amount at the time of hitting of the resulting golf ball is increased, and the hit golf ball creates blown-up trajectory, which reduces the flight distance. On the other hand, when the diameter of the center is larger than 40 mm, the thickness of the intermediate layer or the cover is too small, and the technical effects accomplished by the presence of the intermediate layer or the cover are not sufficiently obtained.

In the golf ball of the present invention, it is required that a surface hardness in Shore D hardness of the center 1 be higher than a central point hardness in Shore D hardness of the center 1 by not less than 15, preferably not more than 17, more preferably not more than 19. When the hardness difference between the surface and central point of the center is smaller than 15, the technical effects of restraining the spin amount at the time of hitting are not sufficiently obtained, which reduces the flight distance. In addition, the shot feel is hard and poor. On the other hand, when the hardness difference is too large, the deformation amount at the time of hitting is large, and the durability is poor. Therefore, it is desired for the hardness difference to be not more than 40, preferably not more than 35.

In the golf ball of the present invention, it is desired for the center 1 to have a central point hardness in Shore D hardness of 20 to 45, preferably 25 to 42, more preferably 30 to 40. When the central point hardness of the center is lower than 20, the center is too soft, and the rebound characteristics are degraded. In addition, it is required to heighten the hardness of the intermediate layer in order to impart a desired hardness to the golf ball, which degrades the durability. On the other hand, when the central point hardness is higher than 45, the spin amount at the time of hitting is large, which reduces the flight distance. In addition, the shot feel is poor.

In the golf ball of the present invention, it is desired for the center 1 to have a surface hardness in Shore D hardness of 50 to 70, preferably 52 to 68, more preferably 55 to 65. When the surface hardness is lower than 50, the center is too soft, and the rebound characteristics are degraded. On the other hand, when the surface hardness is higher than 70, the shot feel is hard and poor. The term "a surface hardness of the center" as used herein refers to the hardness, which is determined by measuring a hardness at the surface of the center prepared by press molding as described above, that is, at the surface of the center before covering with the intermediate layer. The term "a central point hardness of the center" as used herein refers to the hardness, which is determined by cutting the resulting center into two equal parts and then measuring a hardness at its central point in section.

In the golf ball of the present invention, it is desired for the center 1 to have a specific gravity of 1.05 to 1.25, preferably 1.12 to 1.20. When the specific gravity of the center is smaller than 1.05, it is required to increase the specific gravity of the intermediate layer, and the amount of the filler in the intermediate layer is too large. Therefore, the rubber content in the center is small, and the rebound characteristics are degraded. On the other hand, when the specific gravity is larger than 1.25, since the upper limit of the weight of the golf ball is limited in accordance with the regulations for golf balls, the moment of inertia of the resulting golf ball is small, which reduces the flight distance. In addition, the amount of the filler in the center is too large, and the rubber content in the center is small, which degrades the rebound characteristics.

In the golf ball of the present invention, it is required for the intermediate layer 2 to have a thickness of 0.5 to 8.0 mm, preferably 1.0 to 7.0 mm, more preferably 1.0 to 5.0 mm. When the thickness is smaller than 0.5 mm, the technical effect of the hardness of the intermediate layer is not sufficiently obtained, and the spin amount at the time of hitting can not be sufficiently restrained. On the other hand, when the thickness is larger than 8.0 mm, since the intermediate layer is formed from a relatively hard material, the shot feel is hard and poor.

In the golf ball of the present invention, it is required that a surface hardness in Shore D hardness of the intermediate layer 2 be higher than the central point hardness of the center 1 by 15 to 35, preferably 18 to 30, more preferably 20 to 28. When the hardness difference between the surface of the intermediate layer and the central point of the center is smaller than 15, the spin amount at the time of hitting is increased, and the hit golf ball creates blown-up trajectory, which reduces the flight distance. On the other hand, when the hardness difference is larger than 35, the hardness of the intermediate layer is too high, and the shot feel is hard and poor. In addition, the scuff resistance and durability are poor.

In the golf ball of the present invention, it is desired for the intermediate layer 2 to have a surface hardness in Shore D hardness of 50 to 70, preferably 52 to 68, more preferably 55 to 65. When the hardness is lower than 50, it is required to heighten the hardness of the center in order to impart a proper hardness to the golf ball. Therefore, since it is difficult to accomplish the above hardness difference from the central point of the center, the spin amount at the time of hitting is increased, which reduces the flight distance. On the other hand, when the hardness is higher than 70, the shot feel is hard and poor. In addition, the scuff resistance is poor. The term "a surface hardness of the intermediate layer" as used herein refers to the hardness, which is determined by measuring a hardness at the surface of the two-layer structured core 4 prepared by forming the intermediate layer 2 on the center 1.

In the golf ball of the present invention, it is desired for the intermediate layer 2 to have a specific gravity of 1.05 to 1.20, preferably 1.08 to 1.12. When the specific gravity of the intermediate layer is smaller than 1.05, the moment of inertia of the resulting golf ball is small, which reduces the flight distance. In addition, the specific gravity of the center is too large, and the amount of the filler in the center is too large. Therefore, the rubber content in the center is small, and the rebound characteristics are degraded. On the other hand, when the specific gravity is larger than 1.20, the amount of the filler in the intermediate layer is too large, and the rubber content therein is small, which degrades the rebound characteristics.

The specific gravity of the center and that of the intermediate layer are determined to adjust the moment of inertia of the resulting golf ball to a proper range and to improve the rebound characteristics thereof by increasing rubber content of each layer. However, it is not preferable to decrease the specific gravity of both the center and intermediate layer because of the limitation of the weight of the golf ball. The weight of the golf ball is designed to increase its weight to the upper limit of the regulations as possible in order to improve the flight distance. When the specific gravity of both the center and intermediate layer is small, the specific gravity of the cover is large, and the amount of the filler in the cover is large, which degrades the durability of the resulting golf ball. When the specific gravity of the center and that of the intermediate layer are small, the rubber content of each layer is large, and the rebound characteristics are improved. However, since the specific gravity of both the center and intermediate layer can not decrease without limit as described above, the specific gravity of the both is preferably determined such that there is a certain correlation between the specific gravity of the center and that of the intermediate layer. Since the deformation amount of the intermediate layer is larger than that of the center at the time of hitting, the rebound characteristics of the resulting golf ball are effectively improved by increasing the rubber content of the intermediate layer. It is desired for the specific gravity of the intermediate layer (X) and the specific gravity of the center (Y) to satisfy a correlation represented by the following formula:

$X-Y \leq 0$, preferably the following formula:

$X-Y \leq -0.05$.

When the value of (X–Y) is too large, the specific gravity is too large, and the rebound characteristics of the center are degraded. In addition, the moment of inertia of the resulting golf ball is too small, which reduces the flight distance. Therefore, it is desired for the value of (X–Y) to satisfy a correlation represented by the following formula:

$X-Y \geq -0.2$, preferably the following formula:

$X-Y \geq -0.15$.

In the golf ball of the present invention, the intermediate layer 2 is preferably formed by press-molding the rubber composition as used in the center 1, which contains polybutadiene rubber, a co-crosslinking agent, an organic peroxide, a filler and the like. Since the intermediate layer 2, which is not formed from thermoplastic resin, such as ionomer resin, thermoplastic elastomer, diene-based copolymer and the like, is formed from the press-molded article of the rubber composition, the rebound characteristics are improved and the shot feel is good. Since the center 1 and the intermediate layer 2 are formed from the same vulcanized rubber composition, the adhesion between the center 1 and the intermediate layer 2 is excellent, and the durability is improved. Rubber, when compared with resin, has a little deterioration of performance at low temperature lower than room temperature as known in the art, and thus the intermediate layer 2 of the present invention formed from the rubber has excellent rebound characteristics at low temperature.

At least one layer of cover 3 are then covered on the core 4. In the golf ball of the present invention, it is required for the cover 3 to have a thickness of 0.3 to 1.5 mm, preferably 0.5 to 1.2 mm, more preferably 0.5 to 0.9 mm. When the thickness is smaller than 0.3 mm, the technical effects accomplished by softening the cover are not sufficiently obtained, and the spin amount at short iron shot to approach shot is small, which degrades the controllability. On the other hand, when the thickness of the cover is larger than 1.5 mm, the rebound characteristics of the resulting golf ball are degraded and the spin amount at the time of hitting is increased, and the hit golf ball creates blown-up trajectory, which reduces the flight distance.

In the golf ball of the present invention, it is required that the surface hardness of the intermediate layer 2 be higher than the hardness in Shore D hardness of the cover 3 by 3 to 25, preferably 5 to 23, more preferably 7 to 21. When the hardness difference between the surface of the intermediate layer and the cover is smaller than 3, the hardness of the intermediate layer is too low, and the rebound characteristics are degraded. In addition, the spin amount at the time of hitting is increased, which reduces the flight distance. On the other hand, when the hardness difference is larger than 25, the hardness of the intermediate layer is too high, and the shot feel and scuff resistance are poor.

In the golf ball of the present invention, it is required for the cover 3 to have a hardness in Shore D hardness of 35 to 55, preferably 38 to 52, more preferably 40 to 50. When the hardness of the cover 3 is lower than 35, the spin amount at the time of hitting is increased, and the hit golf ball creates blown-up trajectory, which reduces the flight distance. On the other hand, when the hardness of the cover is higher than 55, the spin amount at short iron shot to approach shot is decreased, and the controllability is poor. The term "a hardness of the cover" as used herein is determined by measuring a hardness (slab hardness) using a sample of a stack of the three or more heat and press molded sheets having a thickness of about 2 mm from the composition for the cover, which had been stored at 23° C. for 2 weeks.

In the golf ball of the present invention, it is desired for the cover to comprise polyurethane-based thermoplastic elastomer as a main component in view of scuff resistance, preferably polyurethane-based thermoplastic elastomer formed by using cycloaliphatic diisocyanate in view of rebound characteristics, scuff resistance, yellowing resistance and the like.

Examples of the cycloaliphatic diisocyanates include one or combination of two or more selected from the group consisting of 4,4'-dicyclohexylmethane diisocyanate ($H_{12}$MDI), which is hydrogenated compound of 4,4'-diphenylmethane diisocyanate (MDI); 1,3-bis(isocyanatomethyl)cyclohexane ($H_6$XDI), which is hydrogenated compound of xylylene diisocyanate (XDI); isophorone diisocyanate (IPDI); and trans-1,4-cyclohexane diisocyanate (CHDI). Preferred is the $H_{12}$MDI in view of general-purpose properties and processability.

Examples of the polyurethane-based thermoplastic elastomers include polyurethane-based thermoplastic elastomer formed by using the $H_{12}$MDI, which is commercially available from BASF Polyurethane Elastomers Co., Ltd. under the trade name "Elastollan" (such as "Elastollan XNY585", "Elastollan XNY90A", "Elastollan XNY97A") and the like.

As the materials used in the cover 3 of the present invention, the above polyurethane-based thermoplastic elastomer may be used alone, but the polyurethane-based thermoplastic elastomer may be used in combination with at least one of the other thermoplastic elastomer, diene-based block copolymer, ionomer resin and the like. Examples of the other thermoplastic elastomers include the other polyurethane-based thermoplastic elastomer, polyamide-based thermoplastic elastomer, polyester-based thermoplastic elastomer, polystyrene-based thermoplastic elastomer, polyolefin-based thermoplastic elastomer and the like. The other thermoplastic elastomer may have function group, such as carboxyl group, glycidyl group, sulfone group, epoxy group and the like.

Examples of the other thermoplastic elastomers include polyurethane-based elastomer, which is commercially available from BASF Polyurethane Elastomers Co., Ltd. under the trade name of "Elastollan" (such as "Elastollan ET880"); polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); styrene-based thermoplastic elastomer available from Asahi Chemical Industry Co., Ltd. under the trade name "Tuftec" (such as "Tuftec H1051"); olefin-based thermoplastic elastomer available from Mitsubishi Chemical Co., Ltd. under the trade name "Thermoran" (such as "Thermoran 3981N"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

The ionomer resin may be a copolymer of ethylene and α,β-unsaturated carboxylic acid, of which a portion of carboxylic acid groups is neutralized with metal ion, or a terpolymer of ethylene, α,β-unsaturated carboxylic acid and α,β-unsaturated carboxylic acid ester, of which a portion of carboxylic acid groups is neutralized with metal ion. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes a sodium ion, a potassium ion, a lithium ion, a magnesium ion, a calcium ion, a zinc ion, a barium ion, an aluminum, a tin ion, a zirconium ion, cadmium ion, and the like. Preferred are sodium ions, zinc ions, magnesium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1605, Hi-milan 1652, Hi-milan 1702, Hi-milan 1705, Hi-milan 1706, Hi-milan 1707, Hi-milan 1855, Hi-milan 1856 and the like. Examples of the ionomer resins, which are commercially available from Du Pont Co., include Surlyn 8945, Surlyn 9945, Surlyn 6320 and the like. Examples of the ionomer resins, which are commercially available from Exxon Chemical Co., include Iotek 7010, Iotek 8000 and the like. These ionomer resins may be used alone or in combination.

The amount of the other thermoplastic elastomer, diene block copolymer or ionomer resin is 0 to 40 parts by weight, preferably 0 to 30 parts by weight, based on 100 parts by weight of the base resin for the cover. When the amount is larger than 40 parts by weight, either scuff resistance, rebound characteristics or yellowing resistance are degraded.

The composition for the cover 3 used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the resin component as long as the addition of the additives does not deteriorate the desired performance of the golf ball cover. If used, the amount of the pigment is preferably 0.1 to 5.0 parts by weight, based on 100 parts by weight of the base resin for the cover.

A method of covering on the core 4 with the cover 3 is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it.

At the time of molding the cover, many depressions called "dimples" are formed on the surface of the golf ball. Furthermore, paint finishing or marking with a stamp may be optionally provided after the cover is molded for commercial purposes.

The golf ball of the present invention is formed, so that it has a diameter of not less than 42.67 mm (preferably 42.67 to 42.82 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

EXAMPLES

The following Examples and Comparative Examples further illustrate the present invention in detail but are not to be construed to limit the scope of the present invention.

(1) Production of Core (i) Production of Center

The rubber compositions for the center having the formulation shown in Table 1 were mixed, and then vulcanized by press-molding in the mold at the vulcanization condition shown in the same Table to obtain spherical centers. The diameter, weight, specific gravity, central point hardness (A) and surface hardness (B) of the resulting centers were measured. The results are shown in Table 3. The hardness difference (B–A) was determined by calculating from the above values of A and B, and the result is shown in the same Table.

(ii) Covering of the Intermediate Layer

The rubber compositions for the intermediate layer having the formulation shown in Table 1 were mixed, and then press-molded in the mold to obtain unvulcanized semi-spherical half-shells for the intermediate layer. The centers produced in the step (i) were covered with the two unvulcanized semi-spherical half-shells, and then vulcanized by press-molding in the mold at 165° C. for 15 minutes to obtain two-layer structured cores 4 having a diameter of 41.2 mm and a weight of 41.1 g, which are obtained by covering the intermediate layer 2 having a thickness and specific gravity shown in Table 3 on the center 1. The surface hardness of the resulting two-layer structured core was measured. The results are shown in Table 3 as the surface hardness of the intermediate layer (C). The hardness difference (C–A) was determined by calculating from the above values of C and A, and the result is shown in the same Table.

TABLE 1

| Core composition | (parts by weight) | | | | | | |
|---|---|---|---|---|---|---|---|
| | A | B | C | D | E | F | G |
| (Center composition) | | | | | | | |
| BR11 *1 | 100 | 100 | 100 | 100 | 100 | 100 | 100 |
| Zinc acrylate | 28 | 33.5 | 36 | 33.5 | 20 | 30 | 25 |
| Zinc oxide | 5 | 5 | 5 | 5 | 5 | 5 | 5 |
| barium sulfate | 24 | 20 | 10.5 | 20 | 23.5 | 21.5 | 21.5 |
| Dicumyl peroxide | 0.8 | 0.8 | 0.8 | 0.8 | 0.8 | 0.8 | 0.8 |
| Diphenyl disulfide | 0.5 | 0.5 | 0.5 | 0.5 | 0.5 | 0.5 | 0.5 |
| Vulcanization condition | | | | | | | |
| Temp (° C.) | 170 | 170 | 170 | 155 | 170 | 170 | 170 |
| Time (min) | 15 | 15 | 15 | 20 | 15 | 15 | 15 |
| (Intermediate layer composition) | | | | | | | |
| BR11 *1 | 100 | 100 | 100 | 100 | 100 | 100 | 100 |
| Zinc acrylate | 33 | 35.5 | 35.5 | 35.5 | 45 | 30 | 45 |
| Zinc oxide | 5 | 5 | 5 | 5 | 5 | 5 | 5 |
| barium sulfate | 3.5 | 0.8 | 10 | 0.8 | 0.5 | 3.0 | 0.5 |
| Dicumyl peroxide | 0.5 | 0.5 | 0.5 | 0.5 | 0.5 | 0.5 | 0.5 |

*1: BR-11 (trade name), high-cis polybutadiene commercially available from JSR Co., Ltd. (Content of 1,4-cis-polybutadiene: 96%)

(2) Preparation of Cover Compositions

The formulation materials for the cover shown in Table 2 were mixed using a kneading type twin-screw extruder to obtain pelletized cover compositions. The extrusion condition was, a screw diameter of 45 mm, a screw speed of 200 rpm, and a screw L/D of 35.

The formulation materials were heated at 160 to 260° C. at the die position of the extruder. Shore D hardness was measured, using a sample of a stack of the three or more heat and press molded sheets having a thickness of about 2 mm from each cover composition, which had been stored at 23° C. for 2 weeks. The results are shown in Tables 2 and 3 as the cover hardness (D). The hardness difference (C–D) was determined by calculating from the above values of C and D, and the result is shown in the same Tables.

TABLE 2

| | (parts by weight) | | |
|---|---|---|---|
| Cover composition | a | b | c |
| Elastollan XNY585 *2 | 100 | — | — |
| Elastollan XNY90A *3 | — | 100 | — |
| Elastollan XNY97A *4 | — | — | 100 |
| Titanium dioxide | 4 | 4 | 4 |
| Cover hardness (Shore D) | 40 | 46 | 52 |

*2 Elastollan XNY585 (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*3 Elastollan XNY90A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*4 Elastollan XNY97A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.

Examples 1 to 3 and Comparative Examples 1 to 4

The cover composition was injection molded to obtain semi-spherical half-shell for the cover. The two-layer structured core produced in the step (ii) was covered with the two semi-spherical half-shells to form a cover layer having a thickness of 0.8 mm. Then, paint was applied on the surface to produce golf ball having a diameter of 42.8 mm and a weight of 45.4 g. With respect to the resulting golf balls, the flight performance, shot feel and scuff resistance were measured or evaluated. The results are shown in Table 4. The test methods are as follows.

(Test Method)

(1) Hardness of Center, and Surface Hardness of Intermediate Layer

The surface hardness of the center is determined by measuring a Shore D hardness at the surface of the center prepared. The central point hardness of the center is determined by measuring a Shore D hardness at the central point of the center in section, after the center is cut into two equal parts. The surface hardness of the intermediate layer is determined by measured a Shore D hardness at the surface of the two-layer structured core, which is obtained by covering the intermediate layer on the center. Shore D hardness is measured with a Shore D hardness meter according to ASTM-D 2240.

(2) Hardness of Cover

The hardness of the cover is determined by measuring a hardness, using a sample of a stack of the three or more heat and press molded sheets having a thickness of about 2 mm from each cover composition, which had been stored at 23° C. for 2 weeks, with a Shore D hardness meter according to ASTM D-2240.

(3) Flight Performance (1)

After a No. 1 wood club (a driver, W#1; "XXIO" loft angle=8 degrees, X shaft, manufactured by Sumitomo Rubber Industries, Ltd.) having metal head was mounted to a swing robot manufactured by Golf Laboratory Co. and each golf ball was hit at head speed of 50 m/sec, the initial velocity and spin amount (backspin amount) immediately after hitting, and flight distance were measured. As the flight distance, total that is a distance to the stop point of the hit golf ball was measured. The measurement was conducted 12 times for each golf ball (n=12), and the average is shown as the result of the golf ball.

(4) Flight Performance (2)

After a sand wedge (SW; "DP-601", manufactured by Sumitomo Rubber Industries, Ltd.) was mounted to a swing robot manufactured by Golf Laboratory Co. and a golf ball was hit at head speed of 21 m/sec, the spin amount (backspin amount) immediately after hitting was measured. The measurement was conducted 12 times for each golf ball (n=12), and the average is shown as the result of the golf ball.

(5) Shot Feel

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

Evaluation Criteria

○: The golfers felt that the golf ball has good shot feel such that impact force at the time of hitting is small.

Δ: The golfers felt that the golf ball has fairly good shot feel.

x : The golfers felt that the golf ball has poor shot feel such that impact force at the time of hitting is large.

(6) Scuff Resistance

After a pitching wedge (PW; "Newbreed Tour Forged", manufactured by Sumitomo Rubber Industries, Ltd.) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

TABLE 3

(Test results)

| Test item | Example No. | | | Comparative Example No. | | | |
|---|---|---|---|---|---|---|---|
| | 1 | 2 | 3 | 1 | 2 | 3 | 4 |
| Core composition | A | B | C | D | E | F | G |
| (Center) | | | | | | | |
| Diameter (mm) | 28.0 | 31.5 | 37.0 | 31.5 | 28.0 | 31.5 | 28.0 |
| Weight (g) | 13.8 | 19.3 | 29.7 | 19.3 | 13.4 | 19.3 | 13.4 |
| Specific gravity | 1.20 | 1.18 | 1.12 | 1.18 | 1.17 | 1.18 | 1.17 |
| Shore D hardness | | | | | | | |
| Central point hardness (A) | 34 | 37 | 39 | 39 | 30 | 35 | 32 |
| Surface hardness (B) | 54 | 55 | 56 | 53 | 48 | 54 | 51 |
| Difference (B-A) | 20 | 18 | 17 | 14 | 18 | 19 | 19 |
| (Intermediate layer) | | | | | | | |
| Thickness (mm) | 6.6 | 4.9 | 2.1 | 4.9 | 6.6 | 4.9 | 6.6 |
| Shore D hardness | | | | | | | |
| Surface hardness (C) | 59 | 61 | 61 | 61 | 67 | 54 | 67 |
| Difference (C-A) | 25 | 24 | 22 | 22 | 37 | 19 | 35 |
| Specific gravity | 1.09 | 1.08 | 1.12 | 1.08 | 1.10 | 1.08 | 1.10 |
| (Cover) | | | | | | | |
| Composition | c | b | a | b | c | c | a |
| Shore D hardness | | | | | | | |
| Hardness (D) | 52 | 46 | 40 | 46 | 52 | 52 | 40 |
| Difference (C-D) | 7 | 15 | 21 | 15 | 15 | 2 | 27 |

TABLE 4

| | Example No. | | | Comparative Example No. | | | |
|---|---|---|---|---|---|---|---|
| Test item | 1 | 2 | 3 | 1 | 2 | 3 | 4 |
| Flight performance (1) (W#1; 50 m/sec) | | | | | | | |
| Initial velocity (m/sec) | 72.3 | 72.2 | 72.1 | 72.3 | 71.8 | 71.6 | 71.9 |
| Spin amount (rpm) | 2320 | 2430 | 2480 | 2640 | 2260 | 2530 | 2390 |
| Total (m) | 267.8 | 266.5 | 265.9 | 262.0 | 265.5 | 261.3 | 264.2 |
| Flight performance (2) (SW; 21 m/sec) | | | | | | | |
| Spin amount (rpm) | 6880 | 7010 | 7050 | 7020 | 6900 | 6750 | 6930 |
| Shot feel | ○ | ○ | ○ | x | x | ○ | x |
| Scuff resistance | ○ | ○ | ○ | ○ | Δ | ○ | Δ |

As is apparent from the results of Table 4, the golf balls of the present invention of Examples 1 to 3, when compared with the golf balls of Comparative Examples 1 to 4, are superior in flight distance, spin amount, shot feel and scuff resistance.

On the other hand, in the golf balls of Comparative Example 1, since the hardness difference (B–A) is too small, the spin amount when hit by a driver is large, which reduces the flight distance, or the shot feel is poor. In the golf ball of Comparative Example 2, since the hardness difference (C–A) is too large, the hardness of the intermediate layer is too high, and the shot feel is hard and poor, or the scuff resistance is poor.

In the golf balls of Comparative Example 3, since the hardness difference (C–D) is too small, the hardness of the intermediate layer is too low, and the initial velocity is small. In addition, the spin amount when hit by a driver is large, which reduces the flight distance. In the golf balls of Comparative Example 4, since the hardness difference (C–D) is too large, the hardness of the intermediate layer is too high, and the shot feel and scuff resistance are poor.

What is claimed is:

1. A multi-piece solid golf ball comprising a core consisting of a center and an intermediate layer formed on the center, and a cover covering the core, wherein the center has a diameter of 25 to 40 mm, and a surface hardness in Shore D hardness of the center is higher than a central point hardness in Shore D hardness of the center by not less than 15, the intermediate layer has a thickness of 0.5 to 8.0 mm, and a surface hardness in Shore D hardness of the intermediate layer is higher than the central point hardness of the center by 15 to 35, the center and intermediate layer comprise cis-1,4-polybutadiene rubber as a main component, the cover comprises polyurethane-based thermoplastic elastomer as a main component, and has a thickness of 0.3 to 1.5 mm and a hardness in Shore D hardness of 35 to 55, and the surface hardness of the intermediate layer is higher than the hardness of the cover by 3 to 25.

2. The multi-piece solid golf ball according to claim 1, wherein the polyurethane-based thermoplastic elastomer is formed by using cycloaliphatic diisocyanate.

* * * * *